Jan. 22, 1957
P. H. PECK, JR
2,778,147
QUICK CHANGE FISHING LINE FLOATS
Filed Aug. 4, 1953
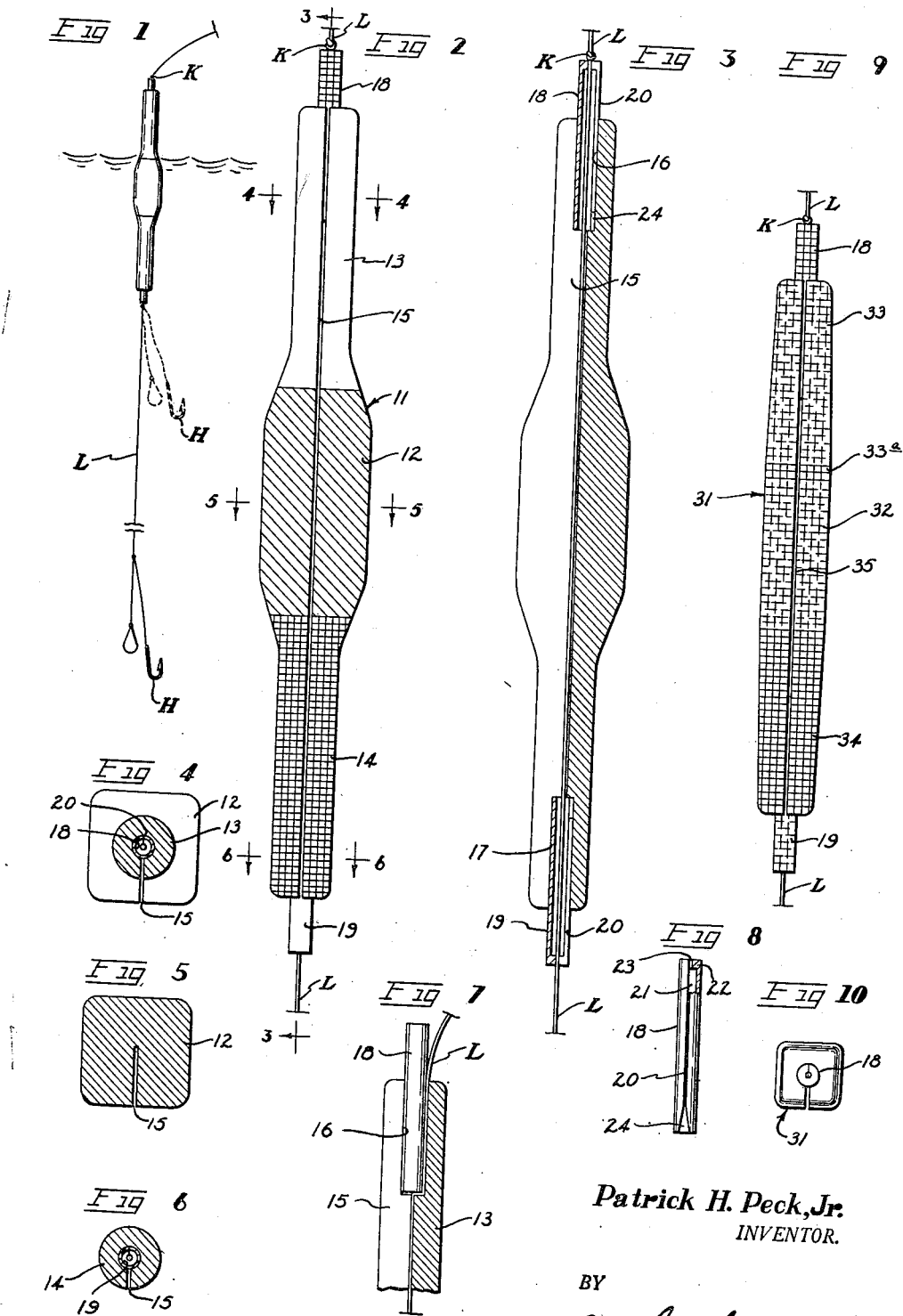
Patrick H. Peck, Jr.
INVENTOR.
BY
Wayland D. Keith
HIS AGENT

United States Patent Office 2,778,147
Patented Jan. 22, 1957

2,778,147

QUICK CHANGE FISHING LINE FLOATS

Patrick H. Peck, Jr., Duncan, Okla.

Application August 4, 1953, Serial No. 372,312

3 Claims. (Cl. 43—44.91)

This invention relates to improvements in fishing floats or bobbers for fishing lines and more particularly to fishing floats through which the line normally is freely slidable and which float may be cast with the hook and sinker, with a casting pole and reel so that the hook and sinker and the float may be cast far into the water as a unit, whereupon the line will slide freely downward through the float until an obstruction such as a knot or bead is encountered within the line, thereby positioning the hook a fixed distance below the surface of the water, or if desired, the float may be rigidly fixed with respect to the fishing line so as to hold the float against longitudinal movement relative thereto.

Various fishing floats have been proposed heretofore, that would enable the casting of the float with the hook and sinker, but these have had certain undesirable characteristics which the present device has overcome.

An object of this invention is to provide a fishing float which has a longitudinal slot therein into which the line may be moved transversely so as to enable the insertion onto or removal of the float from the line at any point in the length thereof.

Another object of the invention is to provide longitudinally slotted guide members for insertion into and removal from the float, which slot resiliently closes so as to maintain the line therein.

A still further object of this invention is to provide an elongated float, the ends of which are reduced in size.

A still further object of this invention is to provide guide members in each end of the fishing float, which have a hole of gauged size therein that is only slightly larger than the line so that a knot tied in the line will obstruct the movement of the line through the guide members.

An embodiment of this invention, together with a modification thereof, is illustrated in the accompanying drawings, in which like reference characters designate like parts in the several views thereof, in which:

Fig. 1 is an elevational view of the device embodying the invention in one form thereof, showing the fishing float in the water and showing the hook and sinker depending therefrom in full outline at fishing depth, and showing the hook and sinker in dashed outline after being cast prior to the movement of the hook and sinker to the fishing depth;

Fig. 2 is a front elevational view of the form of the invention as shown in Fig. 1, and showing the fishing float hatched to show the coloring of the different parts;

Fig. 3 is a sectional view taken on the line 3—3 of Fig. 2, looking in the direction indicated by the arrows;

Fig. 4 is a sectional view taken on the line 4—4 of Fig. 2, looking in the direction indicated by the arrows;

Fig. 5 is a sectional view taken on the line 5—5 of Fig. 2, looking in the direction indicated by the arrows;

Fig. 6 is a sectional view taken on the line 6—6 of Fig. 2, looking in the direction indicated by the arrows;

Fig. 7 is a view of the upper stem portion of the form of the invention, as shown in Figs. 1 through 6, but showing the fishing line wedgingly engaged between the guide member and the inner bore of the float;

Fig. 8 is an elevational view of the line guide member with parts broken away and shown in section to illustrate the details of construction;

Fig. 9 is an elevational view of a modified form of the device embodying the invention; and Fig. 10 is a top plan view of the modified form of the device shown in Fig. 9.

With more detailed reference to the drawing the numeral 11 designates generally a float body, of one form of the invention which body is made of cork, balsa wood, plastic or other material lighter than water and which is adapted to be fitted on the line L. The float or bobber has an enlarged portion 12 approximately mid-way between the ends thereof, which mid portion is squared or polygonal in shape to prevent rolling.

Reduced end portions 13 and 14 protrude outwardly from the body portion 12, and are so reduced in size as to lessen the buoyancy of the float, thereby making the float more sensitive to any movement of the hook, such as might be made by a fish nibbling at the bait while the enlarged portion 12 of the float is immersed in the water. The float is likewise sensitive to any tampering with the baited hook.

The main body portion 12 of the float is sufficiently buoyant to buoy up the sinker and hook the desired amount.

The float, generally designated at 11, is longitudinally slit, as indicated at 15, as will best be seen in Fig. 3, the slit being slightly in excess of one half the thickness of the float. The upper and lower end portions are counterbored so as to be coaxial, as indicated at 16 and 17. The respective counterbores are shouldered so as to receive tubular guide members 18 and 19 respectively for a predetermined depth thereinto. The guide members 18 and 19 are substantially of the same construction as shown in Fig. 8. Each of the guide members 18 and 19 are slitted, as indicated at 20, throughout the longitudinal length thereof and each has an enlarged bore 21 throughout the greater portion of the respective guide members and extending inward from the outer extremity of the respective members. Each outer end of the respective guide members is partially closed by respective end members 22, each of which has a small aperture 23 formed therein, which is only slightly larger than the line L that is adapted to pass therethrough.

It is preferable to have the respective guide members 18 and 19, contrastingly colored to the respective ends of the float in which it is used. The form of the invention, as shown in Figs. 1 through 7, shows one end of the float 13 as being white and the other end 14 as being black, with the intermediate body portion 12 being green. In using this arrangement it is preferable to use the guide member 18 which is black, in the end 13 which is white and to use the guide member 19, which is white, in the end portion 14, which is black. While the float is shown to be arranged with the white end up, it is to be understood that one of the salient features of this invention is the quickness and ease with which the float may be inverted, and threaded into the line L for use with the colors in the inverse relation for day fishing.

It is usually desirable to have the black end portion 14 arranged at the upper end and by having the white tip 19 fitted on the upper end, the float is readily identified at a great distance. At night it is preferable to use the white or lightest colored end of the float uppermost, so upon shining a light thereupon the float will be readily discernable. The end 13 may be coated with fluorescent or luminescent material, so it will glow when a light of a certain characteristic is directed onto the float.

The float is extremely long and slender, particularly the end portions with respect to the body cross-sectional diameter of the body and end portions. It is preferable to have the end portions reduced so that the cross sectional area of the reduced end portions will be less than one-half the cross sectional area of the central body portion, as will be evident by comparing Figs. 5 and 6. The central body portion provides the main buoyancy of the float, and the reduced end portions, particularly the upper end portion, when the float is in the water, has greatly decreased buoyancy from the central portion, therefore a minimum pull on the hook H on the lower end of the line L will be evident by the movement of the float.

The guide members 18 and 19 are preferably made of plastic or other material that has sufficient resiliency to permit the line to be inserted through notch 24 and drawn upward and inward through slot 20 until the line passes into aperture 23, whereupon the line is maintained in this position until the line is passed outward through notch 24, and slot 20, which enables the removal of the line from the apertures 23. When the line is threaded into the respective guide members 18 and 19, and with one of the guide members positioned at each end of the float member 11, the line is threaded transversely into slot 15, whereupon the guide members 18 and 19 are moved along the line to engage counter bores 16 and 17 respectively. It is preferable to position the slots 20 within guide members 18 and 19 in opposite relation to the slot 15. This will prevent the line from normally passing outward therethrough, while casting. However there is little likelihood of the slots 20 opening, as the edges thereof are in abutting relation and are so maintained within the respective counterbores 16 and 17.

When it is desired to maintain the line L in a fixed relation with respect to float 11, one of the guide members 18 or 19 is removed from the counterbore and the line fitted transversely through slot 15 into the float, whereupon the guide member 18 or 19 is pressed into the counter bore so as to wedgingly engage the line L intermediate the guide member and the counterbore.

The form of the invention, as shown in Figs. 9 and 10 is very similar to the form of the invention as shown in Figs. 1 through 7, except the slenderness of the body is substantially greater, thus making the float or bobber even more sensitive to a line pull. In this form of the invention, the float member designated at 31 is squared or polygonal throughout the entire length thereof so as to prevent rolling. The opposite end portions 33—34 preferably are colored contrastingly to the body portion 32, in the present instance the body is shown to be yellow, and one of the ends, the upper end 33 in the present illustration is colored yellow with a demarcation line 33a that is colored black, which line preferably is at the water level when the float is properly weighted. The opposite or lower end 34, as illustrated in Fig. 9, is colored black.

The float body 31 has a longitudinal slot 35 approximately half the depth of the body throughout the length thereof, which body is counterbored at each end thereof, each of which counterbores are in communication with the body slot, as in Fig. 3. Guide members 18 and 19 are fitted within the respective counterbores and which guide members are as shown in Fig. 8. The guide members in the present form of the invention are also contrastingly colored, in the present instance the guide member 18 is black and is fitted in the yellow end 33 of the float, the guide member 19 is colored yellow and is fitted within the end 34 which is black so as to give a contrastingly colored arrangement, as in the case of the first mentioned form of the invention. It is preferable to use the lighter colored end 33 of the float uppermost for fishing by night and the dark colored end 34 uppermost for fishing by day.

In the form of the invention, as shown in Figs. 9 and 10, the device is threaded transversely onto and removed from the fishing line L in the same manner as described above for the first form of the invention. This form of the invention also utilizes the same type of guide which may be fitted into the respective counterbores to maintain the line either in sliding relation with respect thereto, or in fixed relation therewith substantially as shown in Fig. 7.

*Operation*

When it is desired to fish at a specific depth in the water, a knot K is tied in the line and the line reeled onto the reel until the hook and sinker H is moved into position as shown in dashed outline in Fig. 1, whereupon the float, generally designated at 11, the hook and sinker H are cast outward into the water the desired distance. The float will strike the water and the hook and sinker H will draw the line L downward until the knot K engages the upper surface of the guide member 18, at which time the float will come to rest with the desired portion extending above the surface of the water. The amount of float extending above the water is controlled by the weight of the hook and sinker H.

If it is desired to fish with the float in a set position with respect to the line, that is, cast the line into place with the float fixedly secured thereto, the line is removed from the guide member 18 or 19 and placed within the slot 15, and the guide member replaced into the counterbore so as to wedgingly engage the line L to prevent relative slippage between the line and the float.

While the invention has been described in some detail in the embodiments thereof as illustrated, it is to be understood that changes may be made in the minor details of construction and adaptations made to various manners of fishing, without departing from the spirit of the invention or the scope of the appended claims.

Having thus described the invention, what is claimed is:

1. A fishing float comprising a float body, elongated, plastic guide members for use with said float body, said float body having a slot formed therein for receiving a fishing line, the depth of which slot is approximately one-half the thickness of said float body, the body of said float having a bore formed in each end thereof, said bores being coaxial with said body, said elongated plastic guide members having an outside diameter in close fitting relation with said bores of said float body, said guide members each having an integral, relatively thin wall portion at one end thereof, as compared to the length thereof, each of said end portions having an aperture formed therein, said apertures being of a size slightly larger than the size of the fishing line to enable a free sliding movement of the line therethrough, said end wall portions forming a bearing surface, of restricted length, for said fishing line, said guide members each having a counterbore extending throughout the balance of the length thereof, each of said guide members having a slit formed in a side thereof, said slits being in communication with said respective counterbores and with said apertures in said end wall portions, each of said guide members having a V-notch formed therein in communication with the respective slits at the end of the respective guide members opposite said apertures, and said plastic guide members being resilient so that the adjacent edges of the respective slits will normally be in abutting relation, but which will yield upon insertion or removal of the said fishing line into or out of said guide members.

2. A fishing float as defined in claim 1, wherein said float is elongated and comprises a central portion with reduced, elongated end portions extending therefrom.

3. A fishing float as defined in claim 1, wherein said float is elongated and comprises a non-circular central portion with reduced, elongated end portions extending therefrom, which end portions are less than one-half in cross-sectional area than the cross-sectional area of said central portion, said reduced end portions each being at least as long as said central portion.

(References on following page)

References Cited in the file of this patent

UNITED STATES PATENTS

| | | |
|---|---|---|
| 522,167 | Rawlings | June 26, 1894 |
| 771,263 | McCord | Oct. 4, 1904 |
| 1,065,204 | Beals | June 17, 1913 |
| 1,112,049 | Anthony | Sept. 29, 1914 |
| 2,208,240 | Arnesen et al. | July 16, 1940 |
| 2,578,874 | Zaikoski | Dec. 18, 1951 |
| 2,636,305 | Shoenfelt | Apr. 28, 1953 |
| 2,691,842 | Brown | Oct. 19, 1954 |